US012741491B2

(12) United States Patent
Bigi et al.

(10) Patent No.: US 12,741,491 B2
(45) Date of Patent: Sep. 22, 2026

(54) TYRE CHANGING MACHINE AND METHOD FOR USING A TYRE CHANGING MACHINE

(71) Applicant: NEXION S.P.A., Correggio (IT)

(72) Inventors: Mirco Bigi, Carpi (IT); Daniele Aldini, Correggio (IT)

(73) Assignee: NEXION S.P.A., Correggio (IT)

(*) Notice: Subject to any disclaimer, the term of this patent is extended or adjusted under 35 U.S.C. 154(b) by 472 days.

(21) Appl. No.: 18/461,407

(22) Filed: Sep. 5, 2023

(65) Prior Publication Data

US 2024/0075773 A1 Mar. 7, 2024

(30) Foreign Application Priority Data

Sep. 6, 2022 (IT) ........................ 102022000018174

(51) Int. Cl.
*B60C 25/13* (2006.01)
*B60C 25/05* (2006.01)
*B60C 25/138* (2006.01)

(52) U.S. Cl.
CPC .......... *B60C 25/13* (2013.01); *B60C 25/0521* (2013.01); *B60C 25/138* (2013.01)

(58) Field of Classification Search
CPC ..... B60C 25/01; B60C 25/05; B60C 25/0512; B60C 25/0521; B60C 25/0563; B60C 25/13; B60C 25/132; B60C 25/135; B60C 25/138; B60C 25/15; B60B 30/02; B60B 30/06
See application file for complete search history.

(56) References Cited

U.S. PATENT DOCUMENTS 5,215,138 A 6/1993 Toriselli
6,044,888 A * 4/2000 Cunningham .......... B60C 25/00 157/1.1
7,882,882 B2 * 2/2011 Cunningham ........ B60C 25/135 157/1.4
8,347,934 B1 1/2013 Cunningham
2012/0291960 A1 11/2012 Bonacini
(Continued)

FOREIGN PATENT DOCUMENTS

CN 201366914 Y 12/2009
EP 0512595 A1 11/1992
(Continued)

OTHER PUBLICATIONS

Search Report for Italian Patent Application No. 102022000018168, Date of Completion: Apr. 6, 2023, along with Written Opinion, 7 pages.
(Continued)

*Primary Examiner* — Robert J Scruggs
(74) *Attorney, Agent, or Firm* — Chrisman Gallo Tochtrop LLC

(57) ABSTRACT

A tyre changing machine includes a wheel-holder unit, a frame, a bead breaker unit, a lifting device including a lifting arm and a supporting platform defining a horizontal surface on which to rest the wheel. The lifting device also includes a lifting actuator to move the supporting platform between the raised position and the lowered position, and a box-shaped body that is operatively coupled to the flank of the frame; the lifting actuator is at least partly positioned in the box-shaped body.

20 Claims, 5 Drawing Sheets

(56) References Cited

U.S. PATENT DOCUMENTS

| | | | | |
|---|---|---|---|---|
| 2014/0311682 | A1 | 10/2014 | Bonacini | |
| 2015/0273960 | A1* | 10/2015 | Dressler | B60C 25/0521 157/1.24 |
| 2016/0263953 | A1 | 9/2016 | Dressler | |
| 2018/0354320 | A1 | 12/2018 | Sotgiu | |
| 2018/0370302 | A1 | 12/2018 | Sotgiu | |

FOREIGN PATENT DOCUMENTS

| | | | |
|---|---|---|---|
| EP | 1048496 | A1 | 11/2000 |
| EP | 2514613 | A1 | 10/2012 |
| EP | 2796302 | A1 | 10/2014 |
| EP | 2927028 | A1 | 10/2015 |
| EP | 2930038 | B1 | 12/2016 |
| EP | 2524819 | B1 | 7/2017 |
| WO | 2017081554 | A1 | 5/2017 |

OTHER PUBLICATIONS

Search Report for Italian Patent Application No. 102022000018174, Date of Completion: Apr. 3, 2023, along with Written Opinion, 6 pages.

* cited by examiner

100
T
200
X
600
400
Y
301a
503b
304c
5010
400c
304b
400b
300
304
400a
W
504
A
304a
501
700
503a
502
500
S
303
308
302
307
301b

100
T
200
X
Y
Z1
Z2
W
S
400
400a
400b
400c
301
301a
301b
302
303
303a
303a'
303b
304c
305
306
308
501
502
502a
503
503a
503b
600
700

100
T
200
X
600
400
Y
300
301a
400c
400b
304b
304a
W
301
400a
B
C
301b
302
700
303
502
P
R
A
502a

100
T
SW
200
X
400
600
Y
400c
301a
400b
301
304
W
400a
B
C
300
301b
700
302
P
502
500
A
R
502a
S

100
T
200
X
400
Y
Z3
400c
400b
301a
304b
300
304
W
B
C
304a
400a
301
A
301b
302
303
P
502a
600
S
502
700
R

TYRE CHANGING MACHINE AND METHOD FOR USING A TYRE CHANGING MACHINE

This invention relates to a tyre changing machine and to a method for using a tyre changing machine.

The invention applies in particular to the automotive field and, more specifically, to the sector of vehicle service equipment and tyre changers.

Prior art tyre changing machines usually comprise a frame and a wheel-holder unit which is rotatable relative to the frame and on which the wheel is loaded to perform tyre mounting and demounting operations.

Prior art tyre changing machines also comprise a bead breaking arm provided with a bead breaker tool configured to detach the wheel tyre bead from the corresponding rim. In some types of tyre changing machines, the bead breaking arm is articulated to a flank of the frame so that bead breaking is carried out while the wheel is on the floor.

In this situation, the bead breaking arm rotates in a plane parallel to the floor so as to move the bead breaker tool towards and away from the wheel.

As is known, the wheel must be lifted so it can be fixed to the wheel-holder unit so that tyre mounting and demounting operations can be carried out. In the prior art, this can be done using any of various different lifting devices which assist tyre changing machine operators with the loading, positioning and unloading of tyres, rims or wheels.

The prior art thus teaches the use of mobile structures used to lift wheels from the floor and to place them at or near a working position, after which positioning is completed manually.

One example of a mobile structure is known from document EP2514613. In that document, the lifting device comprises a lifting arm extending perpendicularly to a flank of the frame and a supporting platform configured to support the wheel while it is being lifted. In this situation, the supporting platform is articulated to the lifting arm in such a way as to remain parallel to the floor at all times, thus preventing the wheel from falling off while it is being lifted.

Disadvantageously, lifting devices like the one just described are rather cumbersome, especially because the lifting arm protrudes considerably from the frame.

Indeed, when lifting, the lifting arm and the supporting platform must perform an “arc-shaped” movement starting from the floor and up towards the wheel-holder unit, during which they jut out considerably from the side of the frame. This increases the overall dimensions of the tyre changing machine, making it unergonomic and inconvenient to use.

Other examples of tyre changers are provided in patent documents EP2927028A1, CN201366914Y and EP1048496A1.

The tyre changer of EP2927028A1 ha a tool for lifting the wheel from the ground; this tool includes a vertically movable fork for holding the wheel. However, this lifter is disadvantageous, because, when the fork in in the raised position, for the user it is uncomfortable to move the wheel from the fork to place it on the rotatable support (i.e., the wheel-holder unit).

Hence, the need remains for a tyre changing machine of compact in size and with the bead breaking arm articulated to a flank of the frame so that bead breaking is carried out while the wheel is on the floor, wherein the tyre changing machine effectively aids the user in the operation of loading the wheel form the ground to the rotatable support (i.e., the wheel-holder unit). The technical purpose of this invention, therefore, is to provide a tyre changing machine and a method for using a tyre changing machine to overcome the above mentioned disadvantages of the prior art.

This invention therefore has for an aim to provide a tyre changing machine which is compact.

Another aim of this invention, therefore, is to provide a tyre changing machine which is ergonomic.

Another aim of this invention is to provide a reliable, easy method for using a tyre changing machine.

The technical purpose indicated and the aims specified are substantially achieved by a tyre changing machine and a method for using a tyre changing machine comprising the technical features described in one or more of the accompanying claims. The dependent claims correspond to possible embodiments of the invention.

More specifically, the technical purpose and preset aims are achieved by a tyre changing machine for mounting and demounting a tyre to and from a corresponding vehicle wheel rim.

The tyre changing machine may comprise a working head provided at least with a tool configured to facilitate mounting the tyre to the rim.

The tyre changing machine also comprises a wheel-holder unit rotatable about a first vertical axis of rotation and configured to support the wheel rim from which or to which a respective tyre is to be demounted or mounted.

In a possible embodiment, the wheel-holder unit is provided with a supporting plate to which the rim is fixed while the tyre is being removed or mounted using the working head.

More in detail, the wheel rim is anchored to the supporting plate in such a way that the central axis of the wheel coincides with the first axis of rotation.

In this situation, the working head is disposed above the wheel and can be moved towards and away from it so as to operate on the wheel.

The tyre changing machine also comprises a frame which rests on a floor and which has a front portion and a flank.

In the embodiment illustrated, the frame has the shape of a box on which the wheel-holder unit is mounted.

The machine also comprises a bead breaker unit mounted on the flank of the frame and connected thereto. The bead breaker unit includes an abutment surface configured to receive the wheel with the tyre tread resting on a supporting surface at floor level and one sidewall in contact with the abutment surface.

The term “supporting surface” may be used to denote the floor itself or a supporting platform configured to lift the wheel towards the supporting plate after a tyre bead has been detached, as described in detail below.

The supporting platform provides (defines) a flat surface facing upwards.

Hence, the supporting platform is set up to receive the side (tread) of the tyre resting on the flat surface. The flat surface is oriented horizontally, i.e. perpendicularly to the weight force, that is, parallel to the ground. Thus, while the wheel is positioned on the supporting platform, it can be pivoted about a vertical axis Z3; also, the wheel may undertake a rolling movement on the flat surface of the supporting platform. In this way, it is particularly comfortable for the user to move (manually) the wheel from the supporting platform to the wheel-holder unit, once the supporting platform is in the raised position.

In the embodiment illustrated, the abutment surface is applied to a lateral portion of the frame and is covered with a material, for example, rubber, capable of preventing damage to the wheel rim in contact with it. The abutment surface may also be textured, as shown in the accompanying drawings, to prevent the sidewall of the wheel from slipping when it is in contact with the abutment surface.

The bead breaker unit also comprises a bead breaking arm articulated to the frame to rotate about a second vertical axis.

The bead breaking arm comprises a first end, articulated to the frame, specifically to a lateral portion of the frame, and a second end.

The bead breaker unit also comprises a paddle shaped bead breaker tool mounted on the bead breaking arm.

More in detail, the bead breaker tool is mounted on the second end of the bead breaking arm.

The bead breaker unit also comprises a bead breaker actuator connected to the bead breaking arm to move the bead breaker tool towards and away from the abutment surface, so as to detach the tyre bead from an annular edge of the rim of the wheel that is in contact with the abutment surface.

In use, therefore, to detach the tyre bead from a wheel rim, the wheel is placed in such a way that its sidewall is in contact with the abutment surface and the tyre tread rests on the supporting surface.

After that, the bead breaker actuator is activated so as to set the bead breaking arm in rotation about the second axis of rotation, that is, about the first end of the bead breaking arm itself, thus bringing the bead breaker tool towards the abutment surface. In this situation, the bead breaker tool comes into contact with the tyre and is inserted at least partly between the tyre and the corresponding rim so as to detach the tyre bead from the annular edge of the wheel rim.

To prevent the bead breaking arm from interfering with the tyre, the bead breaking arm comprises a first stretch extending along a substantially horizontal axis and a second stretch that is connected to the first stretch and substantially perpendicular to the first stretch.

More specifically, the second stretch and the first stretch of the bead breaking arm make an angle with each other such that when the bead breaker tool is moved close to the wheel to perform bead breaking, the wheel is inside a concavity or arcuate portion defined by the first and the second stretch without interfering with the bead breaking arm.

Following the action of the bead breaker tool, the bead breaking arm is moved away, the wheel is rotated about its axis and the bead breaking arm is moved closer to it again so that the bead breaker tool can operate on another point to detach the bead. The to-and-fro movement of the bead breaker tool is repeated until the bead is completely free of the annular edge of the rim.

When bead breaking is over, the bead breaker actuator is activated one last time to set the bead breaking arm in rotation about the second axis of rotation, that is, about the first end of the bead breaking arm itself, thus moving the bead breaker tool away from the abutment surface so that, if necessary, the wheel can be lifted and loaded onto the wheel-holder unit.

To drive the bead breaker actuator, the tyre changing machine may comprise a driving element which, in a possible embodiment, is mounted on the bead breaking arm.

The driving element alternately adopts an advance position, where it drives the bead breaker tool to move the bead breaker tool towards the abutment surface, and a return position, where it drives the bead breaker actuator to move the bead breaker tool away from the abutment surface.

In an embodiment, the driving element is also configured to adopt an intermediate position, where it stops driving the bead breaker actuator in order to hold the bead breaking arm still.

In other words, in at least one embodiment, the driving element is a control means grippable by an operator to control the bead breaker actuator so as to advance the bead breaker tool towards the wheel, to move the bead breaker tool away from the wheel and to hold the bead breaker tool at the intermediate position.

In the preferred embodiment, the driving element is rotatable about an axis of rotation in a first direction, corresponding to the advance position, and in a second direction, opposite of the first direction, corresponding to the return position.

In a possible embodiment, the driving element comprises a handle, a ring, a knob or the like, which can be rotated about a corresponding axis of rotation.

In the preferred embodiment, the driving element comprises a handle grippable by the operator, and a control ring at one end of the handle along the axis of rotation and rotatable in the first and second directions in such a way as to move the bead breaker tool.

In this embodiment, the axis of rotation of the control ring is horizontal.

In the preferred embodiment illustrated, the driving element also comprises a supporting rod extending from the bead breaking arm and configured to support the handle and the control ring in such a way as to keep them at a height from the floor that is ergonomically convenient for use by the operator.

The tyre changing machine preferably comprises an elastic return mechanism operating on the driving element to elastically return it to the intermediate position.

In other words, when the driving element (rotated in the first or the second direction) is released, that is to say, when the operator lets go of the driving element, the elastic return element takes the driving element back to the intermediate position so it stops driving the bead breaker actuator and holds the bead breaking arm at the current position.

In use, therefore, an operator holds the driving element with one hand and rotates it in the first direction. In this situation, the bead breaker actuator is driven to rotate the bead breaking arm about the first end so as to bring the bead breaker tool towards the wheel.

In the embodiment illustrated, the operator grips the handle and rotates the control ring in the first direction.

When the bead breaker tool has securely engaged the wheel, the operator lets go of the handle which, thanks to the elastic return mechanism, moves to the intermediate position. In this situation, the bead breaker actuator is in a stand-by condition to keep the bead breaking arm, hence the bead breaker tool, at the position reached.

When the bead is detached, the operator rotates the driving element in the second direction, opposite of the first direction. In the embodiment illustrated, the operator grips the handle and rotates the control ring in the second direction.

In this situation, the bead breaker actuator is made to rotate the bead breaking arm about the first end so as to move the bead breaker tool away from the wheel to allow another wheel to be put in its place or to allow the same wheel to be repositioned so that the bead breaker tool can act on another point of the tyre to detach the bead completely.

During this movement, too, the driving element can be released and, thanks to the elastic return element, moves to the intermediate position. In this situation, the bead breaker actuator is in a stand-by condition to keep the bead breaking arm, hence the bead breaker tool, at the position they had reached when the operator released the driving element.

The fact that the driving element can be released so that the bead breaking arm, hence the bead breaker tool, remains at the current position is particularly advantageous especially when the bead breaker actuator is driven to move the bead breaker tool away from the wheel.

In particular, the fact that the driving element can be released so the bead breaking arm remains at any intermediate position between the closed position, where the bead breaker tool operates on it, and the open position, where the bead breaker tool has reached its maximum end of stroke (that is, the second connecting point is at its maximum distance away from the first connecting point) allows wheels of different sizes to be handled by the same machine quickly and easily.

Indeed, the fact that the bead breaking arm remains at the position it occupied when the driving element was moved to the intermediate position and holds that position until the driving element is rotated again, means that every time the bead has to be detached, the bead breaker tool does not need to be moved away to the maximum distance from the abutment surface allowed by the bead breaker actuator.

More in detail, for wheels smaller than the maximum size that the tyre changing machine can handle, the fact that the bead breaking arm can be released at any intermediate position means that when the wheel on which bead breaking is to be performed needs to be positioned or when it needs to be removed after bead breaking has been completed, the bead breaker tool does not necessarily have to be fully opened to its maximum distance from the wheel allowed by the bead breaker actuator, and that in turn means that bead breaking times are reduced.

According to an aspect of this disclosure, the tyre changing machine also comprises a lifting device including a lifting arm.

As shown in the accompanying drawings, the lifting arm is movable in a plane parallel to the abutment surface.

The lifting device comprises a supporting platform defining a horizontal surface on which to rest the wheel.

In the embodiment illustrated, the supporting platform is made in the form of a rigid table provided with at least one sloping portion adapted to define a ramp to make it easier to roll the wheel into position on it.

Preferably, the supporting platform has two sloping portions extending transversely to the abutment surface so as to make it easier to load the wheel onto it (by rolling) from either side of the supporting platform.

Alternatively, the supporting platform might comprise a plurality of rollers, each having an axis of rotation perpendicular to the abutment surface. In this situation, the wheel could be positioned on the rollers even during bead breaking so as to make it easier to rotate the wheel about its axis to vary the points operated on by the bead breaker tool to detach the bead.

The supporting platform is connected to the lifting arm and is movable between a lowered position, where it can receive the wheel to be lifted off the floor, and a raised position, where it is lifted to make it easier to place the wheel on the wheel-holder unit.

According to an aspect of this disclosure, the supporting platform is located at a position substantially facing the flank of the frame.

In a possible embodiment, the supporting platform is located at a position facing the abutment surface so that during bead breaking, the sidewall of the tyre is abutted against the abutment surface, whilst the tyre tread rests entirely on the supporting platform. In this situation, the supporting surface is defined by the supporting platform so that as soon as bead breaking is completed, the wheel can be lifted directly to the wheel-holder unit.

Alternatively, the supporting platform faces the abutment surface but is partly offset relative thereto along a direction parallel to the flank of the frame so that during bead breaking, the tyre tread rests partly on the floor and partly on the supporting platform. In this situation, once the bead is detached, the wheel can be rolled entirely onto the supporting platform, with the aid of the sloping portion, for example, and then lifted to the wheel-holder unit.

Alternatively, the supporting platform faces the flank of the frame but is totally offset relative to the abutment surface along the direction parallel to the flank of the frame (that is, to one side of the abutment surface) so that during bead breaking, the tyre tread rests entirely on the floor. In this situation, once the bead has been detached from the rim by the bead breaker unit, the wheel is placed on the supporting platform and then lifted and carried to the wheel-holder unit.

According to an aspect of this disclosure, the supporting platform is hinged to a first end of the lifting arm to rotate about the first end itself.

Looking in more detail, the lifting device comprises a connecting rod configured to define, together with the lifting arm, a four-bar linkage for keeping the supporting platform parallel to the floor while it is moving from the raised position to the lowered position and vice versa. In this situation, when the wheel is lifted, there is no risk of the supporting platform tilting and the wheel falling off.

The bead breaker unit also comprises a lifting actuator connected to the lifting arm to move the supporting platform between the raised position and the lowered position.

In the embodiment illustrated in the accompanying drawings, the lifting actuator is connected to the lifting arm at a hinge point interposed between the first end and a second end of the lifting arm. In this situation, the lifting arm is pivoted about the hinge point.

In the embodiment illustrated, the lifting actuator is at least partly positioned in a compartment defined by a box-shaped body operatively coupled to the flank of the frame and having a lateral wall that defines the abutment surface. In this situation, the lifting arm protrudes from one side of the box-shaped body oriented transversely to the abutment surface. More specifically, the lifting arm protrudes towards a zone in front of the front portion of the frame.

In other words, the lifting arm is parallel to the flank of the frame and protrudes from the box-shaped body at the front portion, while the lifting actuator is inserted in the compartment defined by the box-shaped body itself.

This arrangement is particularly advantageous in that the lifting arm does not protrude transversely to the frame and to the abutment surface and thus contributes to reducing the overall dimensions of the tyre changing machine.

In a possible embodiment, the box-shaped body is removably connected to the flank of the frame so it can be removed when necessary.

The tyre changing machine also comprises a plurality of control means configured to activate the lifting actuator for lifting or for lowering and to set the wheel-holder unit in rotation.

In a possible embodiment, the plurality of control means may comprise a control button. The control button may be located on the frame and may be configured to generate a wireless command by which, for example, the wheel-holder unit is set in rotation.

In the embodiment illustrated, the plurality of control means is embodied in the form of a plurality of pedals protruding from the front portion of the frame.

At least one of the pedals is configured to activate the lifting actuator for lowering and/or lifting.

In the preferred embodiment, one pedal is configured to activate the lifting actuator for lowering, while another pedal is configured to activate the lifting actuator for lifting.

In an embodiment, the plurality of pedals also comprises a pedal for driving the wheel-holder unit in rotation.

In an embodiment, the plurality of pedals also comprises a pedal for driving the bead breaker tool towards/away from the wheel.

Advantageously, the driving element positioned on the bead breaking arm and the arrangement of the plurality of control means make the tyre changing machine more ergonomic. More specifically, the driving element positioned in this way allows better control over the bead breaker tool as it advances towards the wheel while the position of the plurality of control means allows the operator, using the lifting device to handle the wheel, to work near the front of the frame at a minimum distance from the wheel-holder unit and from the wheel.

To further facilitate loading the wheel onto the wheel-holder unit, the lifting device comprises an auxiliary platform integral with the lifting arm and configured to define an additional supporting surface for the wheel.

In the embodiment illustrated, the auxiliary platform extends along the lifting arm, parallel to the flank of the frame.

In the embodiment illustrated, the auxiliary platform is smaller in width than the supporting platform.

Advantageously, if the wheel to be lifted towards the wheel-holder unit is particularly small, it is possible, when the supporting platform is at the lowered position and the lifting arm inclined towards the floor, to roll the wheel onto the auxiliary platform and to proceed to lifting it.

In a possible embodiment, the auxiliary platform, too, comprises a guiding portion that defines a ramp sloping towards the supporting platform and configured to facilitate moving the wheel from the supporting platform to the auxiliary platform towards the wheel-holder unit.

In other words, the edge of the auxiliary platform facing the supporting platform is bent towards the supporting platform to define a ramp sloping towards the supporting platform itself.

In an embodiment, the auxiliary platform also comprises a stopping portion oriented transversely to the lifting arm and configured to act as a mechanical stop for the wheel.

In a possible embodiment, the stopping portion is defined by an edge, specifically an edge of the auxiliary platform perpendicular to the arm, facing the box-shaped body and bent to form a wing.

In another possible embodiment, the stopping portion is separate from the auxiliary platform and is reversibly mounted thereon.

In use, therefore, to lift the wheel towards the wheel-holder unit, an operator places the wheel on the supporting platform and moves to the front of the frame. Next, the operator operates one of the control means to activate the lifting actuator. In this situation, the lifting actuator is configured to position the lifting arm substantially parallel to the floor so that the auxiliary platform is juxtaposed with the supporting platform at the raised position. In this situation, the wheel placed on the supporting platform is brought towards the wheel-holder unit with the aid of the guiding portion.

This disclosure also relates to a method for using a tyre changing machine. The method comprises a step of providing a tyre changing machine for mounting and demounting a tyre to and from a corresponding vehicle wheel rim.

The tyre changing machine comprises a wheel-holder unit rotatable about a first vertical axis of rotation and configured to support the wheel rim from which or to which a respective tyre is to be demounted or mounted.

The machine also comprises a frame having a front portion and a flank.

According to an aspect of this disclosure, the tyre changing machine comprises a bead breaker unit.

The bead breaker unit could be a bead breaker unit of known type.

In the embodiment illustrated, the bead breaker unit is mounted on the flank of the frame and is connected thereto and is configured to cause the tyre bead to be detached from an annular edge of the wheel rim.

To detach the bead, the wheel is positioned in such a way that the tyre tread rests on the floor and one sidewall of the wheel is in contact with an abutment surface.

The tyre changing machine comprises a box-shaped body operatively coupled to the flank of the frame and having a wall that defines the abutment surface. In this situation, the box-shaped body could be connected to the frame removably or fixedly.

The bead breaker unit also comprises a bead breaking arm that is articulated to the frame to rotate about a second vertical axis. More specifically, the bead breaking arm has a first end that is articulated to the frame and a second end to which a paddle shaped bead breaker tool mounted on the second end of the bead breaking arm is operatively connected.

The bead breaking arm rotates in a plane parallel to the floor so as to move the bead breaker tool towards and away from the wheel in order to detach the tyre bead from the rim.

The bead breaker unit also comprises a bead breaker actuator connected to the bead breaking arm to move the bead breaker tool towards and away from the abutment surface.

The method comprises a step of positioning the wheel whose rim must have the tyre removed from it. During this step, the wheel is positioned in such a way that the sidewall of the tyre is in contact with the abutment surface.

The bead breaker unit might, in a possible embodiment, also comprise a driving element connected to the bead breaking arm and configured to drive the bead breaker actuator.

In this situation, the method comprises a step of positioning the driving element at an advance position, where it drives the bead breaker tool to move the bead breaker tool towards the abutment surface.

In the preferred embodiment, the driving element is rotatable about a horizontal axis of rotation. In this embodiment, the driving element comprises a handle grippable by the operator, and a control ring at one end of the handle. In this situation, the step of positioning is defined by a step of rotating the control ring about an axis of rotation in a first direction corresponding to the advance position.

By so doing, the bead breaking arm rotates about the first end to move the bead breaker tool up against the tyre.

The method then comprises a step of detaching the bead of the wheel tyre from the annular edge of the wheel rim using the bead breaker tool.

Next, the method comprises a step of positioning the driving element at a return position, where it drives the bead breaker actuator to move the bead breaker tool away from the abutment surface. In this situation, the step of positioning is defined by a step of rotating the control ring about its axis of rotation in a second direction corresponding to the return position.

Also in the embodiment in which the bead breaker unit comprises the driving element as described above, the driving element is also configured to adopt an intermediate position, where it stops driving the bead breaker actuator in order to hold the bead breaking arm still.

More in detail, the driving element at the intermediate position allows keeping the bead breaker actuator on standby so as to hold the bead breaking arm at the position it currently occupies. In this situation, the method comprises a step of positioning the driving element at the intermediate position. This step may be performed either while the bead breaking arm is moving the bead breaker tool towards the wheel, or while it is moving the bead breaker tool away from the wheel.

The tyre changing machine also comprises a lifting device including a lifting arm and a supporting platform defining a horizontal surface on which to rest the wheel.

The supporting platform is connected to the lifting arm and is movable between a lowered position, where it can receive the wheel to be lifted off the floor, and a raised position, where it is lifted to make it easier to place the wheel on the wheel-holder unit.

The lifting device also comprises a lifting actuator connected to the lifting arm to move the supporting platform between the raised position and the lowered position.

In the preferred embodiment, the lifting actuator is at least partly positioned in a compartment defined by the box-shaped body.

In this situation, during the step of bead breaking, the supporting platform is at a lowered position and the sidewall of the wheel is in contact with the abutment surface.

In a possible embodiment, the wheel may have the tyre tread resting entirely on the supporting platform. Alternatively, the wheel may have the tyre tread resting on the floor. In the latter case, when bead breaking has been completed, the method comprises a step of moving the wheel onto the supporting platform so it can be carried towards the wheel-holder unit.

When the bead breaker tool has completed the step of bead breaking, the method comprises a step of lifting the wheel by loading the wheel onto the supporting platform at the lowered position and then lifting the supporting platform.

In this step, the supporting platform is movable along a plane parallel to the abutment surface and is held parallel to the floor by, for example, a connecting rod which is configured to define a four-bar linkage in conjunction with the lifting arm.

Advantageously, the arrangement and movement of the lifting arm and supporting platform make the tyre changing machine more compact and ergonomic.

The wheel is thus moved near the wheel-holder unit and tipped onto the supporting plate so it can be driven in rotation to complete the removal of the tyre from the rim.

In a preferred embodiment, when the wheel is lifted towards the wheel-holder unit, it may be made to rotate about a vertical axis Z3 (perpendicular to the supporting platform) so that the tyre tread faces the guiding portion that defines the ramp sloping towards the auxiliary platform. Next, the wheel is made to roll on the guiding portion towards the auxiliary platform. In this situation, the guiding portion can be used as a ramp for lifting the wheel by simply rolling it off the supporting platform and onto the auxiliary platform. After that, once the wheel is on the auxiliary platform, the wheel is again rotated about the vertical axis Z3 in such a way as to position it with the rim parallel to the flank of the frame so it can then be easily tipped over.

In the preferred embodiment, the tyre changing machine comprises a plurality of control means configured to activate the lifting actuator for lifting or for lowering and to set the wheel-holder unit in rotation.

In an embodiment, the plurality of control means is embodied in the form of a plurality of pedals protruding from the front portion of the frame.

Alternatively, the plurality of control means is embodied in the form of a pushbutton panel or control console.

The method comprises a step, performed by at least one of the plurality of control means, of activating the lifting actuator for lifting or for lowering, and a step, performed by at least one of the plurality of control means, of activating the wheel-holder unit to set it in rotation.

Advantageously, the method is particularly effective and easy to implement. Advantageously, the method allows carrying the wheel up to the wheel-holder unit quickly and easily.

Further features and advantages of this invention are more apparent in the exemplary, hence non-limiting, description of an embodiment of a tyre changing machine and of a method for using a tyre changing machine.

The description is set out below with reference to the accompanying drawings which are provided solely for purposes of illustration without limiting the scope of the invention and in which.

Figure 1:
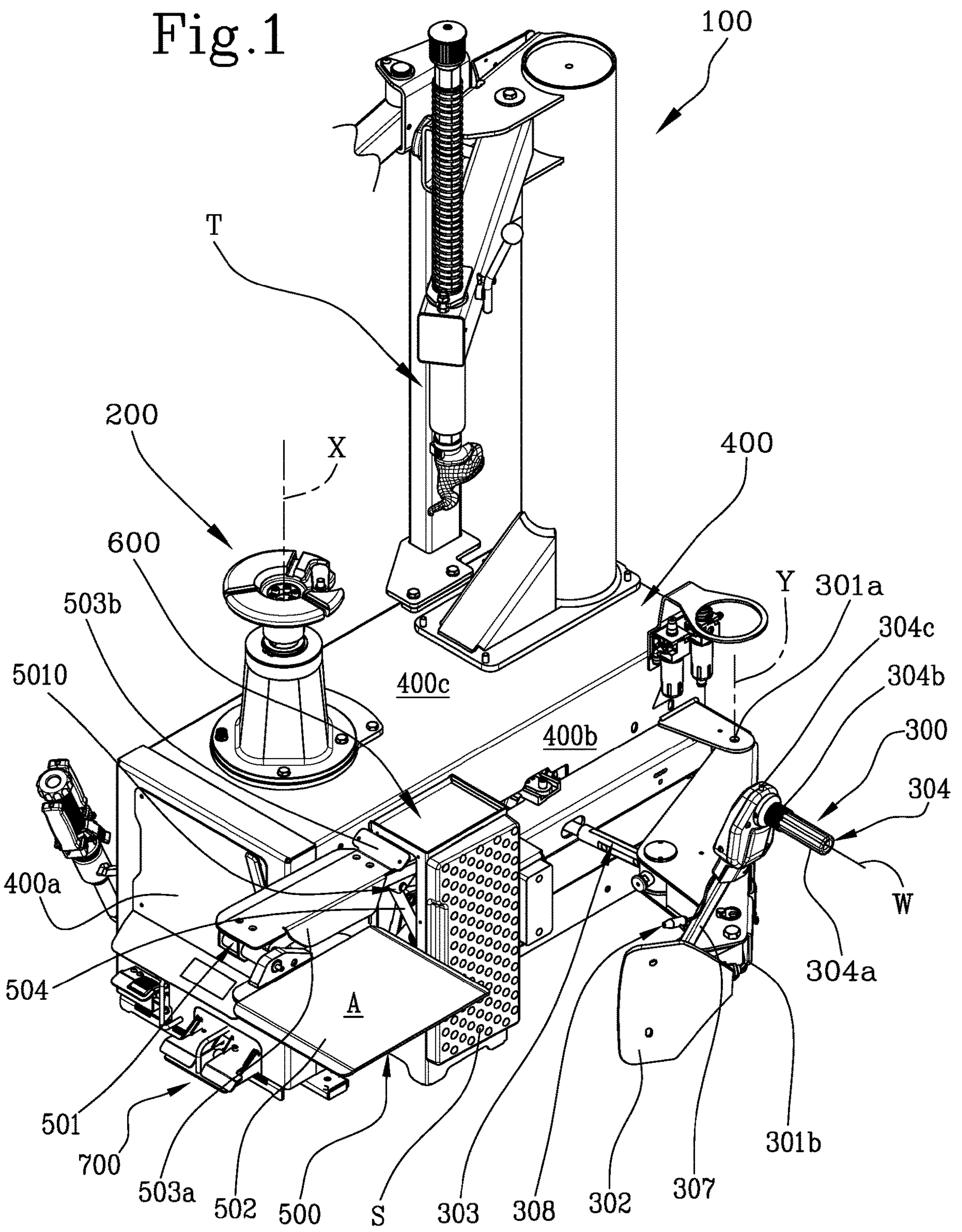
FIG. 1 shows a perspective view of the tyre changing machine of this disclosure with the supporting platform at a raised position.

With reference to the accompanying drawings, the numeral 100 denotes a tyre changing machine comprising a wheel-holder unit 200 rotatable about a first vertical axis of rotation X and configured to support the wheel rim C from which or to which a respective tyre P is to be demounted or mounted.

In the embodiment illustrated, the wheel-holder unit 200 is provided with a supporting plate to which the rim C is fixed while the tyre is being removed or mounted.

The tyre changing machine 100 also comprises a frame 400 which rests on a floor and which has a front portion 400*a* and a flank 400*b*.

In the embodiment illustrated, the frame 400 has the shape of a box from whose top wall 400*c* the wheel-holder unit 200 protrudes.

The tyre changing machine 100 also comprises a bead breaker unit 300 mounted on the flank 400*b* of the frame 400 and including an abutment surface S configured to receive the wheel R with the tread B resting on a supporting surface A at floor level and a sidewall SW abutted against the abutment surface S.

The term "supporting surface" may be used to denote the floor itself or a supporting platform 502 configured to lift the wheel R towards the wheel-holder unit 200, as described in detail below.

The bead breaker unit 300 also comprises a bead breaking arm 301 articulated to the frame 400 to rotate about a second vertical axis Y, parallel to the first vertical axis X.

The bead breaking arm 301 comprises a first end 301*a* that is articulated to the frame 400, in particular to the flank 400*b* thereof, and a second end 301*b*.

The bead breaker unit 300 also comprises a (e.g. paddle shaped) bead breaker tool 302 mounted on the bead breaking arm 300.

More in detail, the bead breaker tool 302 is mounted on the second end 301*b* of the bead breaking arm 300.

Figures 2A, 2B:
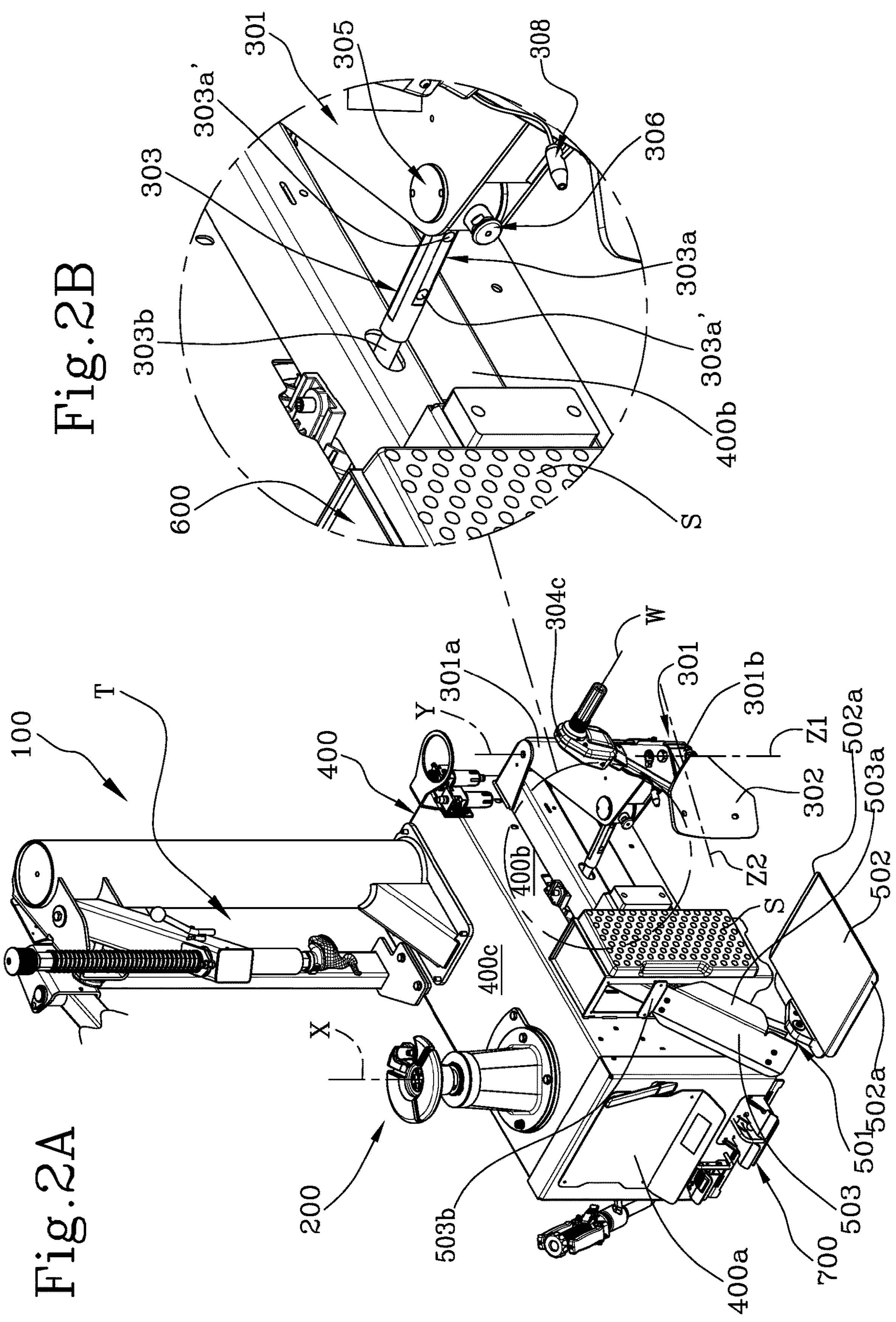
FIG. 2A shows a perspective view of the tyre changing machine with the supporting platform at a lowered position.
FIG. 2B shows a detail from FIG. 2A.

The bead breaker tool 302 is configured to rotate about a vertical adjustment axis Z1, that is, an axis parallel to the first axis of rotation X (FIG. 2A).

In this situation, the bead breaker tool 302 is coupled to the second end 301*b* of the bead breaking arm 301 so it can rotate about the vertical adjustment axis Z1. This aspect is particularly advantageous in that it allows adjusting the position of the bead breaker tool 302 based on the width of the wheel R from whose rim C the tyre P is to be removed.

Alternatively or in addition to the adjustment described above, the bead breaker tool 302 is configured to rotate about a horizontal adjustment axis Z2, that is, an axis perpendicular to the vertical adjustment axis Z1 (FIG. 2).

In this situation, the bead breaker tool 302 is coupled to the second end 301*b* of the bead breaking arm 301 so it can rotate about the horizontal adjustment axis Z2. This aspect is particularly advantageous in that it allows adjusting the position of the bead breaker tool 302 based on the diameter of the wheel R from whose rim C the tyre P is to be removed.

The tyre changing machine 100 also comprises a bead breaker actuator 303 connected to the bead breaking arm 301 to move the bead breaker tool 302 towards and away from the abutment surface S, so as to detach the bead of the tyre P from an annular edge of the rim C of the wheel R that is in contact with the abutment surface S.

Figure 3A:
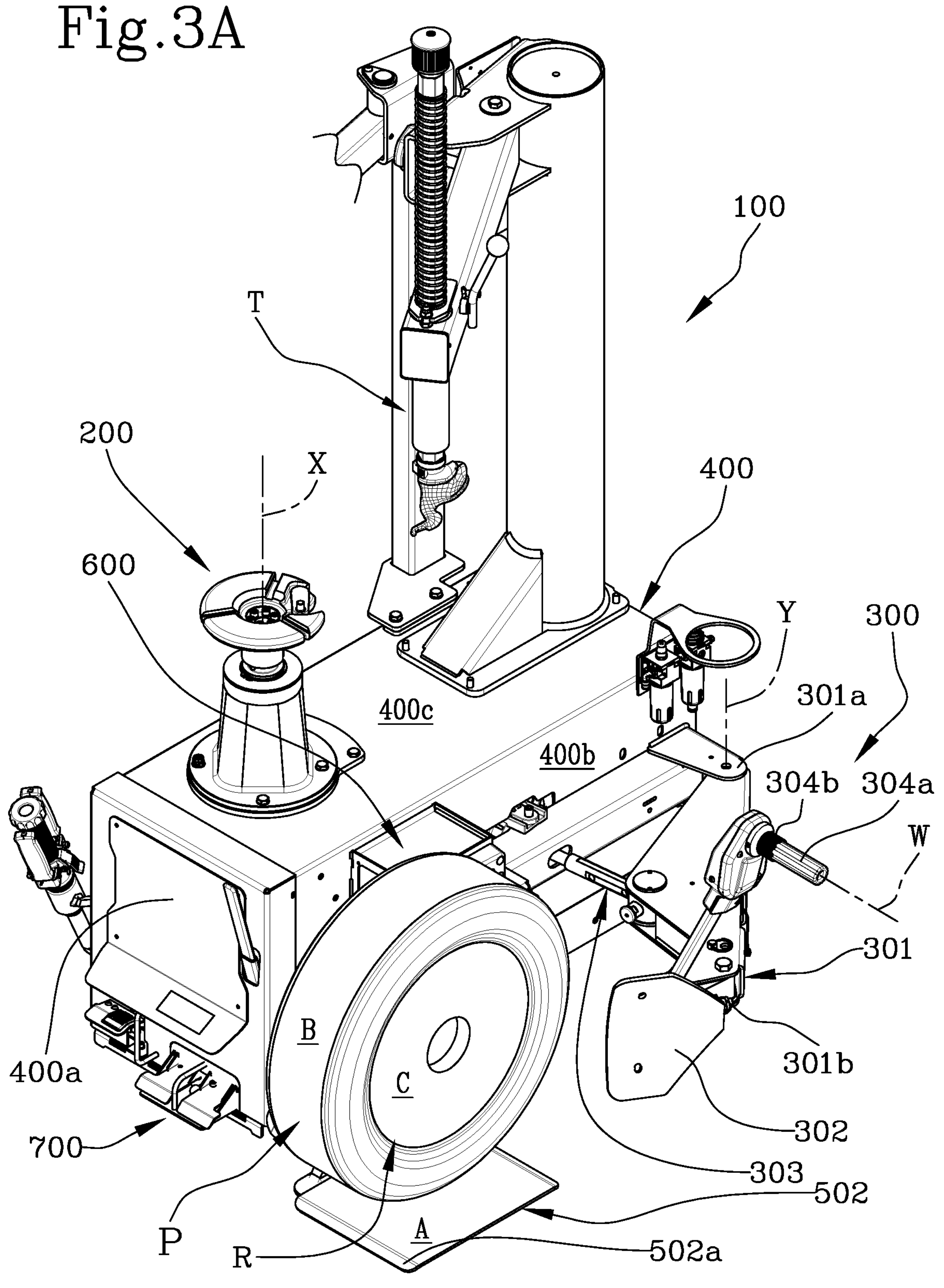
FIGS. 3A and 3B show perspective views of the tyre changing machine in two different operating configurations.
Figure 3B:
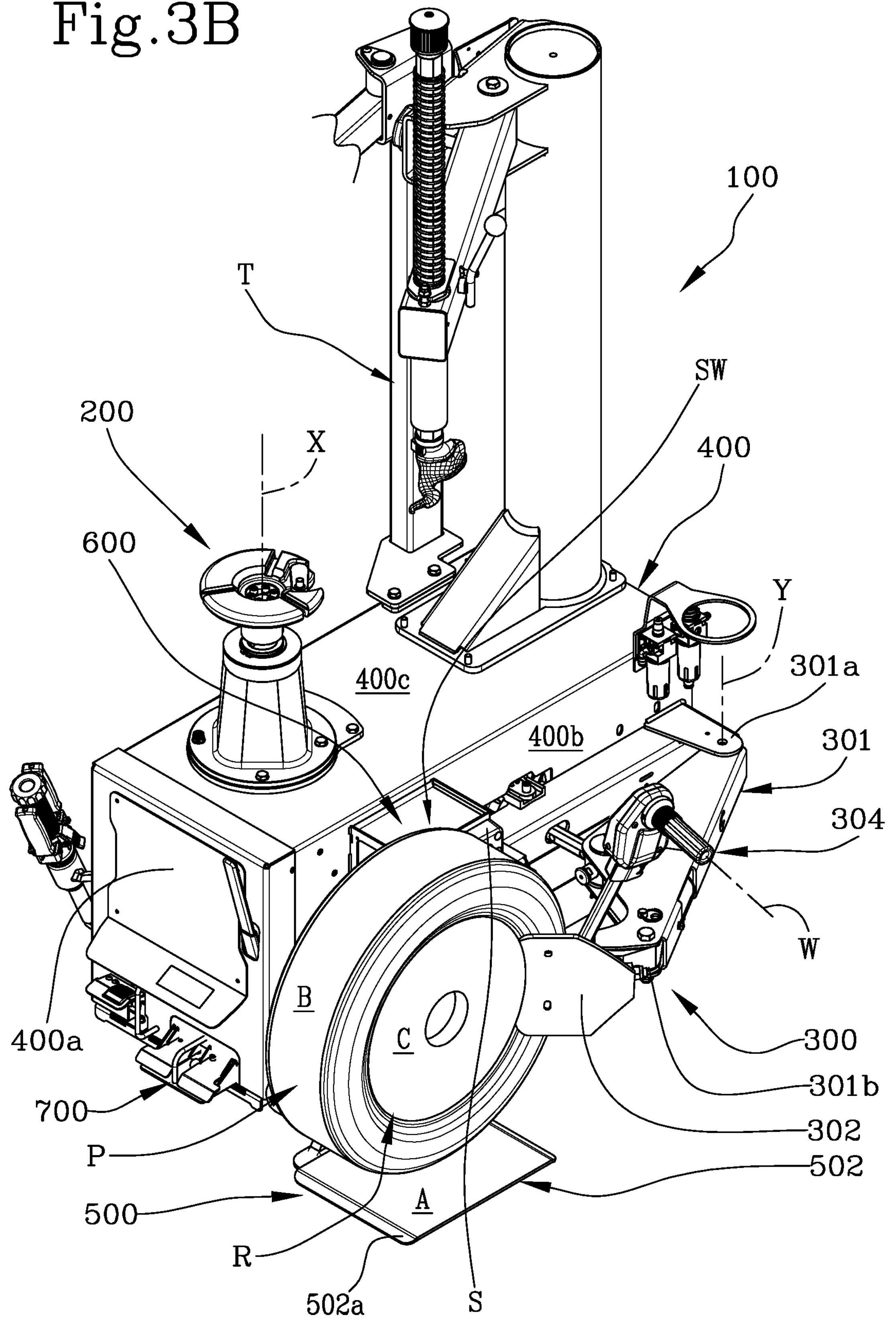

In other words, the bead breaker actuator 303 is configured to cause the bead breaking arm 301 to rotate about the first end 301*a* so as to carry the bead breaker tool 302 towards or away from the wheel R which is suitably positioned against the abutment surface S (FIGS. 3A and 3B).

Looking in more detail, the bead breaker actuator 303 has a first end that is interconnected at a first connecting point inside the frame 400, and a second end that is connectable to the bead breaking arm 301 at a second connecting point.

In an embodiment, the bead breaker actuator 303 has a stem 303*b*, which protrudes through a suitable hole made in the frame 400, and a tubular body 303*a*, which is fixed to the stem 303*b*.

The second connecting point is adjustable so as to define a plurality of connection configurations, corresponding to a plurality of maximum distances between the second connecting point and the first connecting point.

In other words, by adjusting the second connecting point, the maximum distance between the second connecting point and the first connecting point of the bead breaker actuator 303 varies, as does the angle swept by the bead breaking arm 301 when it moves the bead breaker tool 302.

In the embodiment illustrated in the accompanying drawings, the second connecting point is defined by the interconnection, preferably a fit by insertion, between the tubular body 303*a* and a receiving block made on the bead breaking arm 301.

The tubular body 303*a* has a plurality of seats 303*a*', aligned along the length of the bead breaker actuator 303.

Each seat 303*a*' is configured to receive an adjustment element 306. In this situation, the tubular body 303*a* is inserted into the receiving block which is in turn provided with a seat capable of receiving the adjustment element 306.

In this situation, depending on which seat 303*a*' is aligned with the seat of the receiving block, the maximum distance between the first and the second connecting point differs so that the movement of the bead breaking arm 301 can be adapted based on the size of the wheel R whose rim C must have the tyre P removed from it (FIG. 2B).

In this situation, the adjustment element 306 is useful to switch the bead breaker actuator 303 from one connection configuration to another connection configuration.

In the embodiment illustrated, the adjustment element 306 comprises a coupling pin, configured to define different positions of the first connecting point relative to the second connecting point.

In use, therefore, to detach the bead of the tyre P from the rim C of a wheel R, the wheel is placed in such a way that its sidewall SW is in contact with the abutment surface S and the tyre tread B rests on the supporting surface A.

Next, the adjustment element 306 is positioned to define a predetermined connection configuration, that is to say, in such a way as to define the maximum distance reachable by the second connecting point relative to the first connecting point.

After that, the bead breaker actuator 303 is activated so as to set the bead breaking arm 301 in rotation about the second axis of rotation Y, that is, about the first end 301*a* of the bead breaking arm 301 itself, thus bringing the bead breaker tool 302 towards the abutment surface S. In this situation, the bead breaker tool 302 comes into contact with the tyre P and is inserted at least partly between the tyre P and the corresponding rim C so as to detach the bead of the tyre P from the annular edge of the rim C.

As shown, for example, in FIG. 3B, when the bead breaker tool 302 is moved close to the wheel R to detach the bead, interference between the bead breaking arm 301 and the tyre P is prevented by the fact that the bead breaking arm 301 comprises a first stretch extending along a substantially horizontal axis and a second stretch that is connected to the first stretch and substantially perpendicular to the first stretch.

More specifically, the second stretch and the first stretch of the bead breaking arm 301 make an angle with each other such that when the bead breaker tool 302 is moved close to the wheel R to perform bead breaking, the wheel R is inside a concavity or arcuate portion defined by the first and the second stretch without interfering with the bead breaking arm 301.

To drive the bead breaker actuator 303, hence the bead breaking arm 301, the tyre changing machine 100 comprises a driving element 304 mounted on the bead breaking arm 301.

In the embodiment illustrated, the driving element 304 is mounted at the end of a supporting rod 307 extending away from the bead breaking arm 301.

According to an aspect of this disclosure, the driving element 304 alternately adopts an advance position, where it drives the bead breaker actuator 303 to move the bead breaker tool 302 towards the abutment surface S, and a return position, where it drives the bead breaker actuator 303 to move the bead breaker tool 302 away from the abutment surface S.

In other words, when the driving element 304 adopts the advance position, the bead breaker actuator 303 moves the bead breaking arm 301 (and the bead breaker tool 302 connected thereto) close to the abutment surface S, hence to the wheel R (FIG. 3B). When the driving element 304 adopts the return position, on the other hand, the bead breaker actuator 303 moves the bead breaking arm 301 (and the bead breaker tool 302 connected thereto) away from the abutment surface S, hence away from the wheel R (FIG. 3A).

The driving element 304 is also configured to adopt an intermediate position, where it stops driving the bead breaker actuator 303 in order to hold the bead breaking arm 301 still.

In other words, at the intermediate position, the driving element 304 keeps the actuator on stand-by so that the latter is neither retracted nor extended and keeps the bead breaking arm 301 (hence the bead breaker tool 302) at the current position.

It is observed that, when the driving element 304 is set in the intermediate position, it keeps the bead breaking arm 301 stationary (and locked) in the current position of the bead breaking arm (i.e. the position in which the bead breaking arm is at the instant in which the actuation element is positioned in the intermediate position). The "current position" of the bead breaking arm 301 can be any position between the end positions of the bead breaking arm (generally speaking, the current position is intermediate between the end positions); the current position is decided by the user, who arrests the breaking arm 301 in the position where the breaking arm 301 is positioned in the instant when the user sets the driving element 304 in the intermediate position.

The fact that the bead breaking arm 301 can be held (stationary and locked) at an intermediate position different from that where it is close to the wheel R or as far as possible from it (and, more in general, any position at the discretion of the user, between the first and second end positions of the bead breaking arm 301), makes detaching the bead quicker, particularly because the user normally processes a plurality of wheels of the same typology (and size) in a row.

Figure 4:
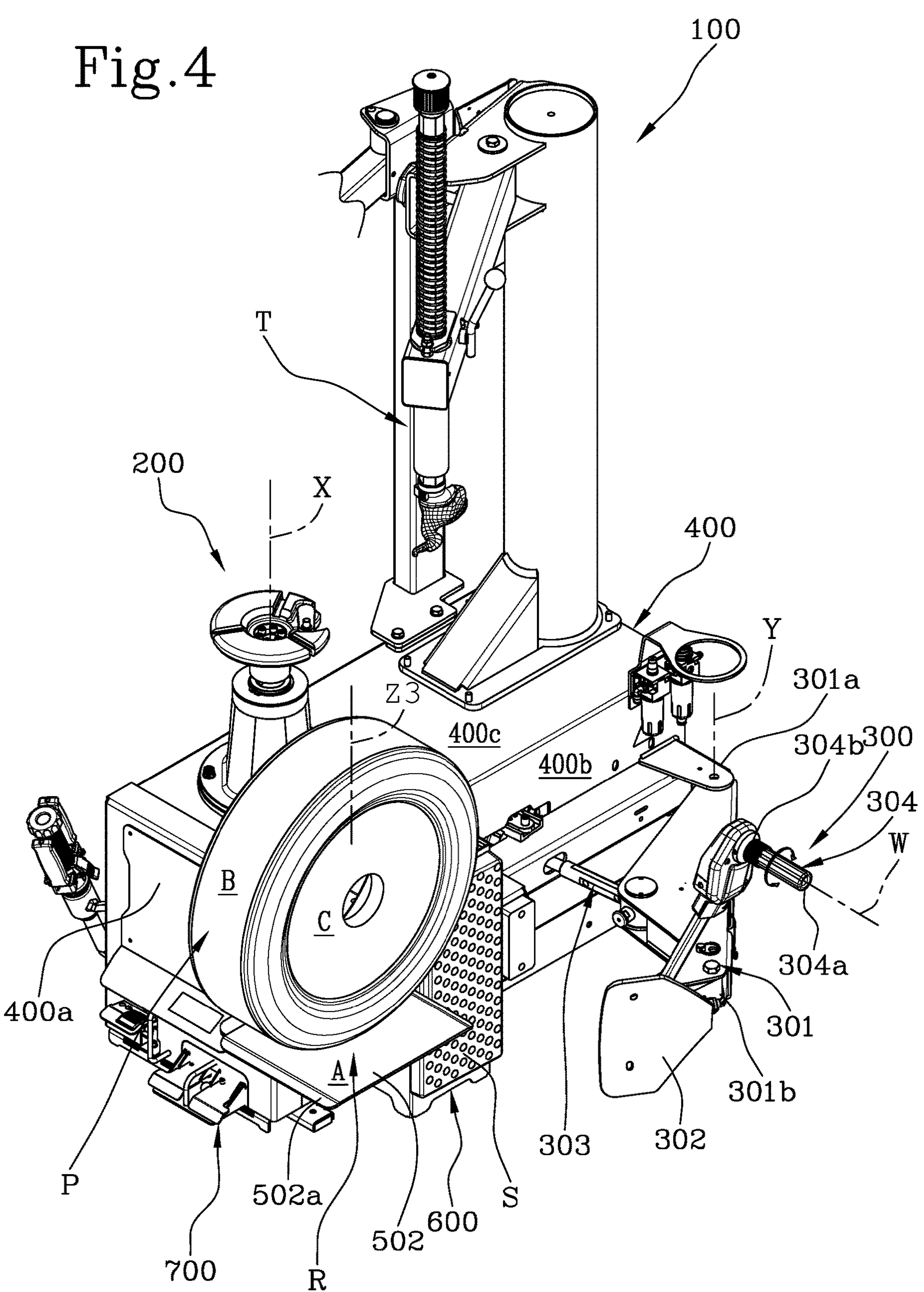
FIG. 4 shows a perspective view of the tyre changing machine during use.

Unlike prior art tyre changing machines 100, where the bead breaking arm 301 was movable between the position close to the wheel (FIG. 3B) and that where it is as far as possible from it (that is, the position occupied by the bead breaking arm 301 when the bead breaker actuator 303 has reached the end of its stroke, FIG. 3A), in the tyre changing machine 100 of this invention, the bead breaking arm 301 can be stopped at any intermediate position (FIG. 4).

In the preferred embodiment, the driving element 304 is rotatable about an axis of rotation W, preferably horizontal, in a first direction, corresponding to the advance position, and in a second direction, opposite of the first direction, corresponding to the return position.

In the embodiment illustrated, the driving element 304 comprises a handle 304*a*, rubber coated, for example, grippable by the operator, and a control ring 304*b* fitted at one end of the handle 304*a* along the axis of rotation W and rotatable according to what is stated above in order to move the bead breaker tool 302.

The tyre changing machine 100 also comprises an elastic return mechanism operating on the driving element 304 to elastically return the driving element 304 to the intermediate position.

In other words, when the driving element 304 (rotated in the first or the second direction) is released, that is to say, when the operator lets go of the driving element 304, the elastic return element takes the driving element 304 back to the intermediate position so it stops driving the bead breaker actuator 303 and holds the bead breaking arm 301 at the current position.

With reference to the embodiment illustrated, when an operator operatively holding the handle 304*a* with one hand to keep the control ring 304*b* at the rotated position, releases the control ring 304*b*, the latter moves back to the intermediate position so that the bead breaker actuator 303 holds the bead breaking arm 301 at the position it had when the control ring 304*b* was released.

In an alternative embodiment, the control ring 304*b* could be integrated in the handle 304*a*. In this situation, to move the bead breaking arm 301, an operator operatively holding the handle 304*a* with one hand rotates the handle to the advance position or the return position.

In use, once the wheel R has been positioned with the sidewall SW in contact with the abutment surface S and the tyre tread B on the supporting surface A, an operator places one hand operatively on the handle 304*a* and rotates the control ring 304*b* in the first direction.

In this situation, the bead breaker actuator 303 is driven to rotate the bead breaking arm 301 about the first end 301*a* so as to bring the bead breaker tool 302 into contact with the wheel R.

When the bead breaker tool 302 has securely engaged the wheel R, the operator lets go of the handle 304 which, thanks to the elastic return mechanism, moves to the intermediate position. In this situation, the bead breaker actuator 303 is in a stand-by condition to keep the bead breaking arm 301, hence the bead breaker tool 302, at the position reached.

As shown in FIG. 3B, in this situation, the bead breaker tool 302 is inserted between the tyre P and the rim C so as to detach the bead.

Next, the operator rotates the control ring 304*b* in the second direction and the bead breaker actuator 303 is driven to rotate the bead breaking arm 301 about the first end 301*a* so as to move the bead breaker tool 302 away from the wheel R.

While the bead breaker tool 302 is being moved away, and even if the bead breaker actuator 303 has not yet reached the end of its maximum stroke, the operator can release the control ring 304*b* again, and this, thanks to the elastic return mechanism, moves back to the intermediate position and holds the bead breaking arm 301 still. This allows repositioning the wheel R so as to operate on it with the bead breaker tool 302 or replacing it with another wheel R without each time having to take the bead breaker tool 302 back to the maximum distance allowed by the stroke of the bead breaker actuator 303.

As shown in FIG. 2A, the tyre changing machine 100 may also comprise a lifting device 500 including a lifting arm 501.

As shown in FIGS. 1 and 2A, the lifting arm 501 is movable in a plane parallel to the abutment surface S.

This prevents the lifting arm 501 from jutting from the frame 400 and thus reduces the overall dimensions of the tyre changing machine 100.

The lifting device 500 comprises a supporting platform 502 defining a horizontal surface on which to rest the wheel R (FIG. 4).

In the embodiment illustrated, the supporting platform 502 is made in the form of a rigid table provided with at least one guiding portion 502*a* adapted to define a ramp to make it easier to roll the wheel R into position on it.

The supporting platform 502 is substantially in the shape of a rectangle whose long side is disposed parallel to the flank 400*b* of the frame 400.

The supporting platform 502 is connected to the lifting arm 501 and movable between a lowered position, where it can receive the wheel R to be lifted off the floor, and a raised position, where it is lifted to make it easier to place the wheel R on the wheel-holder unit 200.

According to an aspect of this disclosure, the supporting platform 502 is located at a position substantially facing the flank 400*b* of the frame 400. According to an aspect of this disclosure, the supporting platform 502 is hinged to a first end of the lifting arm 501 to rotate about the first end itself. The lifting arm 501, hence the supporting platform 502, moves in a plane parallel to the flank 400*b* or to the abutment surface S.

The lifting device 500 comprises a connecting rod configured to define, together with the lifting arm 501, a four-bar linkage for keeping the supporting platform 502 parallel to the floor while it is moving from the lowered position to the raised position and vice versa. In this situation, when the wheel R is lifted, there is no risk of the supporting platform 502 tilting and the wheel R falling off.

The lifting device 500 also comprises a lifting actuator connected to the lifting arm 501 to move the supporting platform 502 between the raised position and the lowered position.

In the embodiment illustrated in the accompanying drawings, the lifting actuator is connected to the lifting arm 501 at a hinge point 5010 interposed between the first end and a second end of the lifting arm 501. In this situation, the lifting arm 501 is pivoted about the hinge point 5010.

In the embodiment illustrated, the lifting actuator is at least partly positioned in the compartment defined by a box-shaped body 600 operatively coupled to the flank 400*b* of the frame 400 and having a lateral wall that defines the abutment surface S. In this situation, the lifting arm 501 protrudes from one side of the box-shaped body 600 oriented transversely to the abutment surface S. More specifically, the lifting arm 501 protrudes towards a zone in front of the front portion 400*a* of the frame 400.

In other words, the lifting arm 501 is parallel to the flank 400*b* of the frame 400 and protrudes from the box-shaped body 600 at the front portion 400*a*, while the lifting actuator 501 is inserted in the compartment defined by the box-shaped body 600 itself.

In a possible embodiment, the box-shaped body 600 is removably connected to the flank 400*b* of the frame 400 so it can be removed when necessary.

To further facilitate loading the wheel R onto the wheel-holder unit 200, the lifting device 500 comprises an auxiliary platform 503 integral with the lifting arm 501 and configured to define an additional supporting surface for the wheel R.

In the embodiment illustrated, the auxiliary platform 503 extends along the lifting arm 501, parallel to the flank 400*b* of the frame 400.

In the embodiment illustrated, the auxiliary platform 503 is smaller in width than the supporting platform 502.

According to an aspect of this disclosure, the auxiliary platform 503, too, comprises a guiding portion 503*a* that defines a ramp sloping towards the supporting platform 502 and configured to make it easier to move the wheel R towards the wheel-holder unit 200.

In other words, the edge of the auxiliary platform 503 facing the supporting platform 502 is bent towards the supporting platform 502 to define a ramp sloping towards the supporting platform 502 itself.

The auxiliary platform 503 also comprises a stopping portion 503*b* oriented transversely to the lifting arm 501 and configured to act as a mechanical stop for the wheel R.

In a possible embodiment, the stopping portion 503*b* is defined by an edge, specifically an edge of the auxiliary platform 503, facing the box-shaped body 600 and bent to form a wing.

In another possible embodiment, the stopping portion 503*b* is separate from the auxiliary platform 503 and is reversibly mounted thereon.

The tyre changing machine 100 also comprises a plurality of control means. In the embodiment illustrated, the control means are embodied in the form of pedals 700 protruding from the front portion 400*a* of the frame 400.

At least one of the pedals is configured to activate the lifting actuator for lowering and/or lifting.

In an embodiment, one pedal is configured to activate the lifting actuator for lowering, while another pedal is configured to activate the lifting actuator for lifting.

The plurality of pedals might also comprise a pedal for driving the wheel-holder unit 200 in rotation.

In use, therefore, to lift the wheel R towards the wheel-holder unit 200, an operator rolls the wheel R onto the supporting platform 502.

Next, the operator operates one of the control means to activate the lifting actuator. In this situation, the lifting actuator is configured to position the lifting arm 501 substantially parallel to the floor so that the auxiliary platform 503 is juxtaposed with the supporting platform 502 at the raised position (FIGS. 1 and 4). In this situation, the wheel R placed on the supporting platform 502 is tipped towards the wheel-holder unit 200 with the aid of the guiding portion 503*a*.

More specifically, the wheel R is made to rotate about a vertical axis (perpendicular to the supporting platform 502) so that the tyre tread B faces the guiding portion 503*a* that defines the ramp sloping towards the auxiliary platform 503. Next, the wheel R is made to roll on the guiding portion 503*a* towards the auxiliary platform 503. After that, once the wheel R is on the auxiliary platform 503, the wheel R is again rotated about the vertical axis in such a way as to position it with the rim C parallel to the flank of the frame 400 so it can then be easily tipped over.

This disclosure also relates to a method for using a tyre changing machine 100.

The method comprises a step of providing a tyre changing machine 100 for mounting and demounting a tyre P to and from a corresponding rim C of a vehicle wheel R.

The tyre changing machine 100 comprises a wheel-holder unit 200 rotatable about a first vertical axis of rotation X and configured to support the rim C of the wheel R from which or to which a respective tyre P is to be demounted or mounted, for example, by means of a working head T.

The tyre changing machine 100 also comprises a frame 400 having a front portion 400*a* and a flank 400*b*.

The tyre changing machine 100 also comprises a bead breaker unit 300 mounted on the flank 400*b* of the frame 400 and including an abutment surface S configured to receive a sidewall SW of the wheel R with the tread B resting on a supporting surface A at floor level.

In other words, the bead breaker unit 300 is a floor mounted unit, where the wheel R rests with one sidewall SW against the abutment surface S and with the tyre tread B on the floor or on a supporting platform 502. In the latter case, the supporting platform 502 is a horizontal surface for supporting the wheel R in such a way that it does not rest directly on the floor.

The bead breaker unit 300 also comprises a bead breaking arm 301 articulated to the frame 400 to rotate about a second vertical axis Y.

The bead breaking arm 301 comprises a first end 301*a*, articulated to the frame 400, and a second end 301*b*, on which a bead breaker tool 302 is operatively mounted.

The bead breaker tool 302 is paddle shaped so that it can be inserted between the bead of the tyre P and an annular edge of the rim C to detach the bead therefrom.

In the preferred embodiment, the bead breaker tool 302 is rotatable about a vertical adjustment axis Z1 and/or about a horizontal adjustment axis Z2 so as to adapt the position of the bead breaker tool 302 according to the size of the wheel R. In this situation, the method comprises a step of adjusting, in which the bead breaker tool 302 is adjusted about the vertical adjustment axis Z1 and/or about the horizontal adjustment axis Z2.

The bead breaker unit 300 also comprises a bead breaker actuator 303 connected to the bead breaking arm 301 to move the bead breaker tool 302 towards and away from the abutment surface S, so as to detach the bead of the tyre P from the annular edge of the rim C of the wheel R that is in contact with the abutment surface S. The step of detaching the bead is repeated several times on the tyre P at different, angularly spaced points so as to completely detach the bead from the rim C.

The bead breaker actuator 303 is extended and retracted in such a way as to cause the bead breaking arm 301 to rotate about its first end 301*a* to move the bead breaker tool 302 forwards or backwards.

In the preferred embodiment, the maximum distance which the bead breaker tool 302 can reach relative to the wheel R is adjustable. Looking in more detail, the bead breaker actuator 303 comprises a first end that is interconnected at a first connecting point inside the frame 400, in proximity to the abutment surface S, and a second end that is interconnected with the bead breaking arm 301 at a second connecting point.

The second connecting point is adjustable so as to define a plurality of connection configurations, corresponding to a plurality of maximum distances between the second connecting point and the first connecting point.

In other words, by adjusting the second connecting point, the maximum distance between the second connecting point and the first connecting point varies, as does the angle swept by the bead breaking arm 301 when it moves the bead breaker tool 302.

In this situation, the method thus comprises a step of connecting the second end of the bead breaker actuator 303 to the bead breaking arm 301 so as to define a connection configuration corresponding to a maximum distance of the second connecting point from the first connecting point.

To vary the distance reachable by the second connecting point, if necessary, the tyre changing machine 100 comprises an adjustment element 306, preferably a pin, configured to change the possible stroke of the bead breaker actuator 303. In this situation, the method comprises a step of switching the bead breaker actuator 303 from one connection configuration to another by adjusting the second connecting point using the adjustment element 306.

In this situation, the second connecting point is adjusted in such a way that its maximum distance from the first connecting point is different from what it was previously.

The method thus comprises a step of adjusting the stroke of the bead breaker actuator 303, followed by a step of positioning the wheel R whose tyre P is to be removed from the corresponding rim C.

In this step, the wheel R is rested with one sidewall SW against the abutment surface S, while the tread B may be rested on the floor or on the supporting platform 502 of a lifting device 500, if present, configured to lift the wheel R towards the wheel-holder unit 200.

As shown in FIG. 2A, the bead breaker unit 300 also comprises a driving element 304 connected to the bead breaking arm 301 and configured to drive the bead breaker actuator 303.

According to an aspect of this disclosure, the driving element 304 adopts an advance position, where it drives the bead breaker actuator 303 to move the bead breaker tool 302 towards the abutment surface S.

In this situation, the method comprises a step of positioning the driving element 304 at the advance position.

In the preferred embodiment, the driving element 304 comprises a handle 304*a* grippable by an operator, and a control ring 304*b* at one end of the handle 304*a*. In this situation, the step of positioning corresponds to a step of rotating the control ring 304*b* about an axis of rotation W, preferably horizontal, in a first direction corresponding to the advance position.

Next, the method comprises a step of detaching the bead of the tyre P of the wheel R from the annular edge of the wheel rim C using the bead breaker tool 302.

Once the bead is detached, the method comprises a step of positioning the driving element 304 at a return position, where it drives the bead breaker actuator 303 to move the bead breaker tool 302 away from the abutment surface S.

In the preferred embodiment, since the driving element 304 comprises the handle 304*a* and the control ring 304*b*, the step of positioning corresponds to a step of rotating the control ring 304*b* about the axis of rotation Win a second direction, opposite of the first direction, corresponding to the return position.

In other words, when the driving element 304 adopts the advance position, the bead breaker actuator 303 moves the bead breaking arm 301 (and the bead breaker tool 302 connected thereto) close to the abutment surface S, hence to the wheel R. When the driving element 304 adopts the return position, on the other hand, the bead breaker actuator 303 moves the bead breaking arm 301 (and the bead breaker tool 302 connected thereto) away from the abutment surface S, hence away from the wheel R.

The driving element 304 is also configured to adopt an intermediate position, where it stops driving the bead breaker actuator 303 in order to hold the bead breaking arm 301 still.

In other words, at the intermediate position, the driving element 304 keeps the bead breaker actuator 303 on standby so that the latter is neither retracted nor extended and keeps the bead breaking arm 301 (hence the bead breaker tool 302) at the current position.

In this situation, the method may comprise a step of positioning the driving element 304 at an intermediate position, where it stops driving the bead breaker actuator 303 in order to hold the bead breaking arm 301 still. This step may be performed either while the bead breaker tool 302 is being moved towards the wheel, so that after detaching the bead, the bead breaker tool 302 does not damage the tyre P or the rim C, or while the bead breaker tool 302 is being moved away from the wheel, so as to speed up bead breaking operations.

The steps of moving the bead breaker tool 302 are repeated several times until the bead is completely free of the respective rim C.

In a possible embodiment, once the bead is detached from the rim C, the wheel R may be subjected to other operations by other components of the machine 100.

In this situation, the wheel R must be lifted and placed on the supporting plate.

To lift the wheel R towards the wheel-holder unit 200, the tyre changing machine 100 comprises a lifting device 500.

The lifting device 500 includes a lifting arm 501 and a supporting platform 502.

The supporting platform 502 defines a horizontal surface on which to rest the wheel R and is connected to the lifting arm 501 so as to be movable between a lowered position, where it can receive the wheel R to be lifted off the floor, and a raised position, where it is lifted to make it easier to place the wheel R on the wheel-holder unit 200.

In a possible embodiment, during the bead breaking operation, the supporting platform 502 is at the lowered position and, with its sidewall SW, the wheel R is in contact with the abutment surface S.

In a possible embodiment, during the bead breaking operation, the wheel R rests with the tyre tread B on the supporting platform 502.

Alternatively, after the step of bead breaking, the method comprises a step of placing the wheel R (for example, by rolling it) on the supporting platform 502.

In an embodiment, the method also comprises a step of lifting the wheel R, by rolling the wheel R along the floor and loading the wheel R onto the supporting platform 502 at the lowered position.

In other words, the wheel R is placed on the supporting platform 502, which is then lifted towards the wheel-holder unit 200.

The supporting platform 502 is moved by a lifting actuator 504 connected to the lifting arm 501 to move the supporting platform 502 between the raised position and the lowered position.

In the embodiment illustrated, the lifting actuator is at least partly positioned in the compartment defined by a box-shaped body 600 operatively coupled to the flank 400*b* of the frame 400 and having a lateral wall that defines the abutment surface S.

In this situation, the lifting arm 501 protrudes from one side of the box-shaped body 600 oriented transversely to the abutment surface S. More specifically, the lifting arm 501 protrudes towards a zone in front of the front portion 400*a* of the frame 400.

Once the wheel R has been lifted, it is placed on and secured to the wheel-holder unit 200 which is set in rotation.

In the embodiment illustrated, the lifting device 500 comprises an auxiliary platform 503 integral with the lifting arm 501 and configured to define an additional supporting surface for the wheel R. In this situation, the method comprises a step, performed by the lifting actuator 504, of positioning the lifting arm 501 substantially parallel to the floor and the auxiliary platform 503 juxtaposed with the supporting platform 502, with the supporting platform 502 at the raised position. In this situation, the method comprises a step of rotating the wheel R about a vertical axis (perpendicular to the supporting platform 502) so that the tyre tread B faces the auxiliary platform 503, and a step of rolling the wheel R along the guiding portion 503*a* to position the wheel R on the auxiliary platform 503. Next, the method comprises a further step of rotating the wheel R about the vertical axis to bring the rim C back to being parallel to the flank of the frame 400 and tilt the wheel R towards the wheel-holder unit 200.

After tipping, the wheel-holder unit 200 is activated.

In the embodiment illustrated, the tyre changing machine 100 comprises a plurality of control means, for example, pedals 700, protruding from the front portion 400*b* of the frame 400.

In this situation, the step of lifting the supporting platform 502 to facilitate placing the wheel R on the wheel-holder unit 200, the step of lowering the supporting platform 502 to receive the wheel R from the floor and the step of setting the wheel-holder unit 200 in rotation are performed by means of one or more of the plurality of control means.

This invention achieves the preset aims and overcomes the disadvantages of the prior art.

In particular, the tyre changing machine 100 of this disclosure is more ergonomic, quick and easy to use and versatile in handling wheels of different sizes.

Advantageously, the possibility of releasing the driving element 304 at an intermediate position so that the bead breaker actuator 303 holds the bead breaker tool 302 at a desired position allows reducing the time needed for bead breaking operations.

Advantageously, the possibility of performing a double adjustment of the bead breaker tool 302 makes the tyre changing machine 100 versatile and easy to adapt to wheels R of different sizes.

Advantageously, positioning the driving element 304 gives greater control of the bead breaker tool 302 without having to use a pedal control unit.

Advantageously, the presence of the box-shaped body 600 in which the lifting actuator 504 is inserted and thus the positioning of the lifting arm 501 allow reducing the overall dimensions of the tyre changing machine 100, making it more compact but, at the same time, ergonomic.

Advantageously, the fact that the box-shaped body 600 may be removable from the frame 400 allows further reducing the dimensions of the tyre changing machine 100 when the lifting device 500 is temporarily removed.

In an example, the (bead breaker unit 300 of the) tyre changing machine 100 includes a nozzle 308, configured for spraying a lubricant fluid. The tyre changing machine 100 includes a reservoir of lubricant fluid, the nozzle being in fluid communication with said reservoir. The nozzle 308 is supported on the bead breaking arm 301 (for example, in proximity to the bead breaking tool 302), so that the nozzle 308 can spray the lubricant fluid on a bead of the tyre P, in particular in the region where the tyre abuts of the rim flange. Operatively, the nozzle 308 sprays the lubricant fluid on a bead of the tyre P when the bead breaking arm 301 is in a position close or approached to the wheel arranged at the abirment surface.

Moreover, the driving element 304 includes a spraying command 304*c*, connected to the nozzle 308 for commanding the spraying of the lubricant fluid responsive to an activation by the user of the spraying command 304*c*. The spraying command 304*c* may be provided as a separate command (for example a button) with respect to the control ring 304*b*; alternatively the spraying command 304*c* may be integrated in the control ring 304*b*.

Preferably, the spraying command 304*c* is positioned in proximity to the the handle 304*a*, for example at the at one end of the handle 304*a*, so that the spraying command 304*c* can be activated by the user with the same hand that holds (grips) the handle 304*a*.

Likewise, the method for using a tyre changing machine may comprise a lubricating step, wherein a lubricant fluid is sprayed on a bead of the tyre P through a nozzle 308 mounted on the bead breaking arm 301. Preferably, the nozzle 308 sprays the lubricant responsive to an activation of the spraying command 304*c*, which can be managed manually by the user by means of the hand gripping the knob 304*a*.

The invention claimed is:

1. A tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre (P) is to be demounted or mounted;

a frame having a front portion and a flank and resting on a floor;

a bead breaker unit, mounted on the flank of the frame and connected thereto and including an abutment surface, a bead breaking arm articulated to the frame to rotate about a second vertical axis, a paddle shaped bead breaker tool mounted on the bead breaking arm, a bead breaker actuator, connected to the bead breaking arm to move the bead breaker tool towards and away from the abutment surface, so as to detach the bead of the tyre from an annular edge of the rim of the wheel with the tyre tread resting on a supporting surface at floor level and a sidewall in contact with the abutment surface;

a lifting device, including a lifting arm and a supporting platform defining a horizontal supporting surface on which to rest the wheel, the supporting platform being connected to the lifting arm and movable between a lowered position, where it can receive the wheel to be lifted off the floor, and a raised position, where it is lifted to make it easier to place the wheel on the wheel-holder unit, and a lifting actuator, connected to the lifting arm to move the supporting platform between the raised position and the lowered position;

a box-shaped body operatively coupled to the flank of the frame, the box-shaped body having a lateral wall defining the abutment surface and internally defining a compartment, wherein the lifting actuator is at least partly positioned in the compartment in the box-shaped body-, and wherein the lifting arm protrudes from one side of the box-shaped body oriented transversely to the abutment surface, the lifting arm protruding towards a zone in front of the front portion of the frame.

2. The tyre changing machine according to claim 1, wherein the lifting arm is movable in a plane parallel to the abutment surface.

3. The tyre changing machine according to claim 1, wherein the supporting platform is hinged to a first end of the lifting arm to rotate about the first end and wherein the lifting device comprises a connecting rod configured to define, together with the lifting arm, a four-bar linkage for keeping the supporting platform parallel to the floor while it is moving from the raised position to the lowered position and vice versa.

4. The tyre changing machine according to claim 1, wherein the lifting device comprises an auxiliary platform integral with the lifting arm and configured to define an additional supporting surface for the wheel.

5. The tyre changing machine according to claim 4, wherein the lifting actuator is configured to position the lifting arm substantially parallel to the floor and the auxiliary platform juxtaposed with the supporting platform, with the supporting platform at the raised position.

6. The tyre changing machine according to claim 4, wherein the auxiliary platform comprises a guiding portion that defines a ramp sloping towards the supporting platform and configured to make it easier to move the wheel towards the wheel-holder unit.

7. The tyre changing machine according to claim 4, wherein the auxiliary platform comprises a stopping portion oriented transversely to the lifting arm and configured to act as a mechanical stop for the wheel.

8. The tyre changing machine according to claim 1, wherein the lifting actuator is connected to the lifting arm at a hinge point interposed between a first end and a second end of the lifting arm, the lifting arm being pivoted about the hinge point.

9. The tyre changing machine according to claim 1, wherein the bead breaker unit comprises a driving element, mounted on the bead breaking arm and configured to drive the bead breaker actuator, the driving element alternately adopting an advance position, where it drives the bead breaker actuator to move the bead breaker tool towards the abutment surface, and a return position, where it drives the bead breaker actuator to move the bead breaker tool away from the abutment surface.

10. The tyre changing machine according to claim 1, comprising a plurality of control means configured to activate the lifting actuator for lifting or for lowering and to set the wheel-holder unit in rotation.

11. The tyre changing machine according to claim 1, wherein the supporting platform provides a flat surface facing upwards.

12. The tyre changing machine according to claim 11, wherein the flat surface of the supporting platform is oriented horizontally.

13. The tyre changing machine according to claim 11, wherein the flat surface of the supporting platform, in the raised position of the supporting platform, allows the wheel resting thereupon to be pivoted about a vertical axis.

14. A method for using a tyre changing machine, comprising the following steps:

providing a tyre changing machine for mounting and demounting a tyre to and from a corresponding rim of a vehicle wheel, including:

a wheel-holder unit rotatable about a vertical axis of rotation and configured to support the rim of the wheel from which or to which a respective tyre is to be demounted or mounted;

a frame having a front portion and a flank;

a bead breaker unit, mounted on the flank of the frame and including an abutment surface, a breaker tool movable towards and away from the abutment surface, so as to detach a bead of the tyre from an annular edge of the rim of a wheel with the tyre tread resting on a supporting surface at floor level and a sidewall in contact with the abutment surface;

a lifting device, including a lifting arm, a supporting platform defining a horizontal supporting surface on which to rest the wheel, connected to the lifting arm and movable between a lowered position, where it can receive the wheel to be lifted off the floor, and a raised position, where it is lifted to make it easier to place the wheel on the wheel-holder unit, and a lifting actuator, connected to the lifting arm to move the supporting platform between the raised position and the lowered position;

bead breaking, with the supporting platform at a lowered position, by moving the bead breaker tool towards the wheel;

lifting the wheel, by rolling the wheel along the floor, loading the wheel onto the supporting platform at the lowered position and then lifting the supporting platform, wherein the tyre changing machine also includes a box-shaped body operatively coupled to the flank of the frame, the box-shaped body having a lateral wall defining an abutment surface and internally defining a compartment, wherein the lifting actuator is at least partly positioned in the compartment in the box-shaped body, wherein the lifting arm protrudes from one side of the box-shaped body oriented transversely to the abutment surface, the lifting arm protruding towards a zone in front of the front portion of the frame, and wherein, in the step of bead breaking, the wheel is abutted with its sidewall against the abutment surface and the bead breaker tool is moved towards the abutment surface.

15. The method according to claim 14, wherein the bead breaker unit comprises a driving element, mounted on the bead breaking arm and configured to drive the bead breaker actuator, the method comprising the following steps:

positioning the driving element at an advance position, where it drives the bead breaker actuator to move the bead breaker tool towards the abutment surface;

positioning the driving element at a return position, where it drives the bead breaker actuator to move the bead breaker tool away from the abutment surface.

16. The method according to claim 14, wherein the tyre changing machine comprises a plurality of control means and wherein the method comprises the following steps:

by means of at least one of the plurality of control means, activating the lifting actuator for lifting or lowering;

by means of at least one of the plurality of control means, activating the wheel-holder unit to set it in rotation.

17. The method according to claim 14, wherein the supporting platform provides a flat surface facing upwards.

18. The method according to claim 17, wherein is oriented horizontally during in the lowered position of the supporting platform, in the raised position of the supporting platform and during the movement of the supporting platform from the lowered position to the raised position.

19. The method according to claim 17, wherein, when the supporting platform is in the raised position, the wheel supported on flat surface of the supporting platform is pivoted about a vertical axis.

20. A tyre changing machine for mounting and demounting a tyre to and from a corresponding rim of a vehicle wheel, comprising:

a wheel-holder unit rotatable about a first vertical axis of rotation and configured to support the rim of the wheel from which or to which a respective tyre (P) is to be demounted or mounted;

a frame having a front portion and a flank and resting on a floor;

a bead breaker unit, mounted on the flank of the frame and connected thereto and including an abutment surface, a bead breaking arm articulated to the frame to rotate about a second vertical axis, a paddle shaped bead breaker tool mounted on the bead breaking arm, a bead breaker actuator, connected to the bead breaking arm to move the bead breaker tool towards and away from the abutment surface, so as to detach the bead of the tyre from an annular edge of the rim of the wheel with the tyre tread resting on a supporting surface at floor level and a sidewall in contact with the abutment surface;

a lifting device, including a lifting arm and a supporting platform defining a horizontal supporting surface on which to rest the wheel, the supporting platform being connected to the lifting arm and movable between a lowered position, where it can receive the wheel to be lifted off the floor, and a raised position, where it is lifted to make it easier to place the wheel on the wheel-holder unit, and a lifting actuator, connected to the lifting arm to move the supporting platform between the raised position and the lowered position;

a box-shaped body operatively coupled to the flank of the frame, the box-shaped body having a lateral wall defining the abutment surface and internally defining a compartment, wherein the lifting actuator is at least partly positioned in the compartment in the box-shaped body, and wherein the supporting platform is hinged to a first end of the lifting arm to rotate about the first end and wherein the lifting device comprises a connecting rod configured to define, together with the lifting arm, a four-bar linkage for keeping the supporting platform parallel to the floor while it is moving from the raised position to the lowered position and vice versa.

* * * * *